(12) United States Patent
Feder et al.

(10) Patent No.: US 6,349,539 B1
(45) Date of Patent: Feb. 26, 2002

(54) AXISYMMETRIC, CONVERGING-DIVERGING, JET-DEFLECTING TURBOJET-ENGINE EXHAUST-NOZZLE

(75) Inventors: Didier Georges Feder, Savigny le Temple; Daniel Kettler, Chartrettes; Guy Jean-Louis Lapergue, Rubelles; Bertrand Pierre Renaud Monville, Moissy Cramayel; Jacky Serge Naudet, Bondoufle; Laurent Claude Patrick Salperwyck, Lizines, all of (FR)

(73) Assignee: Snecma Moteurs (FR)

( * ) Notice: Subject to any disclaimer, the term of this patent is extended or adjusted under 35 U.S.C. 154(b) by 0 days.

(21) Appl. No.: 09/613,733

(22) Filed: Jul. 11, 2000

(30) Foreign Application Priority Data

Jul. 12, 1999 (FR) .............................. 9908988

(51) Int. Cl.[7] .............................. F02K 1/00; F02K 1/12
(52) U.S. Cl. ................ 60/232; 239/265.35; 239/265.39
(58) Field of Search ...................... 60/232; 239/265.19, 239/265.33, 265.35, 265.37, 265.39, 265.41

(56) References Cited

U.S. PATENT DOCUMENTS

| 3,537,647 | A | * | 11/1970 | Camoulives et al. .. 239/265.33 |
| 4,508,270 | A | | 4/1985 | Joubert |
| 5,082,182 | A | | 1/1992 | Bruchez, Jr. et al. |
| 5,174,502 | A | | 12/1992 | Lippmeier et al. |
| 5,239,815 | A | | 8/1993 | Barcza |
| 5,513,799 | A | * | 5/1996 | Mendia et al. ......... 239/265.41 |
| 6,067,793 | A | * | 5/2000 | Urruela et al. ......... 239/265.33 |
| 6,212,877 | B1 | * | 4/2001 | Renggli ...................... 60/232 |

FOREIGN PATENT DOCUMENTS

| DE | 27 11 936 A1 | 9/1978 |
| EP | 0 512 833 A1 | 11/1992 |
| EP | 0 687 810 A2 | 12/1995 |

* cited by examiner

Primary Examiner—Ted Kim
(74) Attorney, Agent, or Firm—Bacon & Thomas, PLLC

(57) ABSTRACT

An axisymmetric, converging-diverging turbojet-engine exhaust nozzle for jet deflection. The diverging flaps are connected by linkrods to a vectoring ring (13). The vectoring ring (13) is driven by linear actuators (20) anchored in the stationary structure (2). The linear actuators (20) are connected by a swivel (22) to the vectoring ring (13) and are affixed to the stationary structure (2) to absorb the tangential loads applied by the exhaust gases on the diverging flaps and to allow positioning the vectoring ring (13). Preferably the linear actuator (20) is connected by a sheath (25) to the vectoring ring (13), the sheath (25) slidable on the actuator case (26) and being displaceable in a radial plane passing through the turbojet-engine's axis.

3 Claims, 5 Drawing Sheets

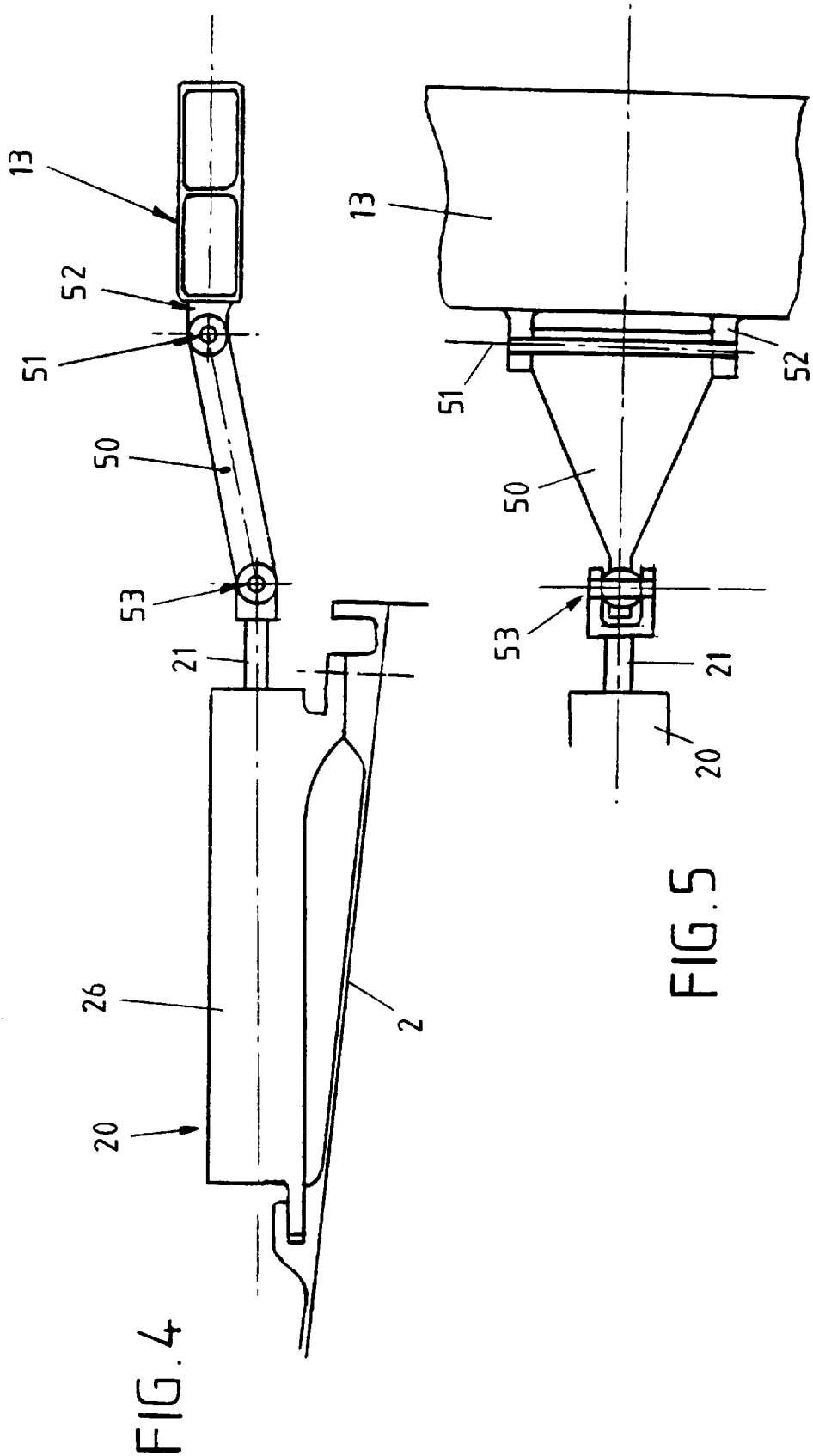

AXISYMMETRIC, CONVERGING-DIVERGING, JET-DEFLECTING TURBOJET-ENGINE EXHAUST-NOZZLE

BACKGROUND OF THE INVENTION

1. Field of the Invention

The invention relates to an axisymmetric, converging-diverging, turbojet-engine exhaust nozzle.

2. Description of the Related Art

More specifically, the invention relates to an axisymmetric, converging-diverging, turbojet-engine exhaust nozzle comprising a ring of converging flaps which hinge on the downstream end of a stationary, annular structure and a ring of diverging flaps which hinge on the downstream end of the converging flaps. Moreover, the diverging flaps connect to a vectoring ring driven by a plurality of linear actuators mounted on the stationary structure in order to regulate the exhaust cross-section and deflect the exhausted gas flow relative to the turbojet-engine axis.

Axisymmetric, converging-diverging exhaust nozzles direct exhaust gas aftward from the aircraft in order to achieve vectored thrust and increased manoeuverability in combat aircraft. Movement of these nozzles is achieved by diverging flaps that are linked to the vectoring ring by secondary cold flaps or by linkrods hinging on the downstream ends of the diverging flaps. When longitudinal displacements of actuator rods are implemented in mutually different ways, the plane of the vectoring ring tips relative to the turbojet-engine axis, and as a result, the secondary cold flaps or the linkrods connected to the ends of the diverging flaps are driven. Consequently, the flow path subtended by the plurality of the diverging flaps slants relative to the turbojet-engine axis. Additionally, when the actuator rod displacements are identical, the vectoring ring translates, making it possible to change the exhaust cross-section of the nozzle's diverging portion.

Maintenance of a well controlled slant angle requires the vectoring ring to be kept in a position relative to the stationary annular structure. Moreover, the slope of the thrust vector entails a differential pressure distribution on the periphery of the diverging flaps or on the secondary cold flaps or linkrods connecting the vectoring ring to the diverging flaps. As a result, lateral loads are applied to the vectoring ring connected to the nozzle's stationary structure.

Several designs are known to keep the vectoring ring substantially concentric with the turbojet-engine axis and to prevent it from moving sideways on account of the above cited lateral loads.

In the patent document WO 92/03649, the vectoring ring comprises three radial stubs directed outward and equidistant by 120° around the axis and sliding in axial apertures between pairs of parallel rails which are solidly joined to the stationary structure and of which the center planes intersect along the turbojet-engine axis. In this design, the center of the vectoring ring defined by the intersection of the stub axes is ideally situated on the turbojet-engine axis. However, the pressure-generated radial torques in the link between the stubs may entail deleterious friction for the jet-deviation position.

In U.S. Pat. No. 5,239,815, the vectoring ring is positioned by a spherical wall solidly affixed to this vectoring ring resting against an outside wall firmly joined to the stationary structure. The lateral loads are absorbed by rollers supported on the ring that roll inside rails connected to the stationary structure.

In U.S. Pat. No. 5,174,502, the vectoring ring is driven into position and the lateral loads are absorbed by rectangular slides solidly joined to the stationary structure while being independent of the linear actuators. The slides are connected, to the vectoring ring by swivels integrated into joints radially hinging on the slide.

SUMMARY OF THE INVENTION

The object of the invention is to integrate the control and positioning of the vectoring ring by linear actuators which absorb the lateral loads caused by the vectored jet of exhaust gases.

The invention achieves its objective in that the proposed exhaust nozzle is characterized by the linear actuators connected in a swiveling manner to the vectoring ring and mounted on the stationary structure in such a way to position the vectoring ring and to absorb the tangential loads applied by the exhaust gases on the diverging flaps.

In a first embodiment of the invention, the linear actuator comprises a case hinging upstream on the stationary structure to allow pivoting motion in a radial plane, a sheath connected by the swivel to the vectoring ring and capable of sliding over the outside surface of the actuator case, and a piston mounted in a sliding manner inside the actuator case wherein the piston rod is firmly joined to the sheath.

Preferably the end of the piston rod connects to the sheath's end wall by a sliding connection element.

Advantageously the sheath slides between two rollers connected to the stationary structure.

In a second embodiment of the invention, the linear actuator comprises a case hinging upstream on the stationary structure in order to pivot in a radial plane, a piston sliding in said case and a piston rod in which one end is connected by a swivel to the vectoring ring.

Advantageously the actuator case slides radially between two guides firmly affixed to the stationary structure.

In a third embodiment of the invention, the linear actuator comprises a case affixed to the stationary structure, a piston sliding in the actuator case and a piston rod in which an end is connected in a swiveling manner to a linkrod which in turn radially hinges on the vectoring ring.

In an embodiment variation of the invention, the vectoring ring consists of two parts which hinge on two diametrically opposite hinges

BRIEF DESCRIPTION OF THE DRAWINGS

Other advantages and features of the invention are elucidated in the illustrative description and in relation to the attached drawings.

FIG. 4 is a sideview of a linear actuator driving the vectoring ring of a third embodiment of the invention, FIG. 5 is a radial view of the linear actuator of the third embodiment of the invention.

DETAILED DESCRIPTION OF PREFERRED EMBODIMENTS OF THE INVENTION

Figure 1:
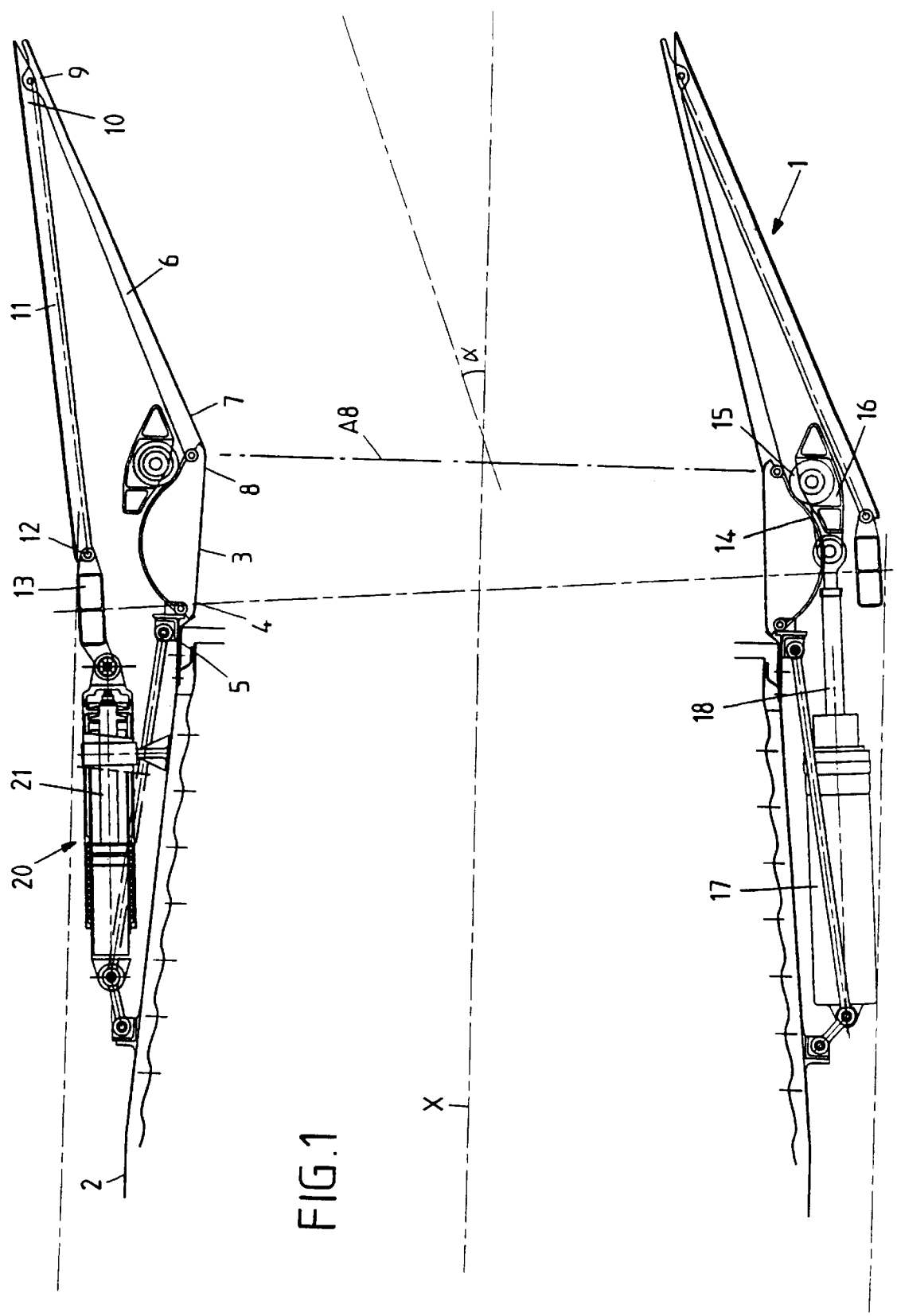
FIG. 1 is a cross-section in an axial plane through the axis of a linear actuator driving the vectoring ring of the exhaust nozzle of FIG. 1.

FIG. 1 shows an axisymmetric, converging-diverging exhaust nozzle 1 situated downstream of an annular, stationary structure 2 having an axis X.

The nozzle 1 comprises a first ring of converging flaps 3 wherein the upstream ends 4 hinge on the downstream end 5 of the stationary structure 2, and a second ring of diverging flaps 6 wherein the upstream ends 7 hinge on downstream ends 8 of the converging flaps 3. Each ring of flaps comprises the same number of driven flaps alternating between the follower flaps.

The diverging flaps 6 are connected to a vectoring ring 13 enclosing the converging flaps 3 by linkrods 11 hinged at their upstream ends on the vectoring ring 13 and hinged at their downstream ends 10 on the downstream ends 9 of the diverging flaps 6. The linkrods 11 may be replaced by secondary, cold flaps or they may support cold flaps situated in the aerodynamic extension of the turbojet's fairing.

Each driven converging flap 3 comprises cam surfaces 14 on its outer surface of which rollers 15 contact in rolling engagement, the rollers 15 being borne on a control ring 16 driven by a plurality of linear actuators 17 anchored upstream on the outer surface of the stationary structure 2, the piston rods 21 of the actuators 20 moving jointly in order to move the drive ring 16 parallel to the axis X of the stationary structure 2. The axial displacement of the control ring 16 changes the circular cross-section A8 of the outlet of the converging portion of the exhaust nozzle 1.

The vectoring ring 13 is driven by at least three linear control actuators 20 equidistantly apart by 120° distributed around the stationary structure 2. When the piston rods 21 of the actuators 20 extend by the same length, the vectoring ring 13 shall be situated in a plane perpendicular to the axis X. However, if the piston rods 21 of the actuators 20 differ in their displacements, the vectoring ring 13 shall be tipped to drive the linkrods 11 connected to the ends of the diverging flaps 6, as a result of which the flow path of the exhaust gases—which is shaped by the diverging flaps—shall be slanted by an angle a relative to the axis X as indicated in FIG. 1. The slope of the thrust vector generates a pressure differential over the periphery of the converging flaps 6 and the linkrods 11. Consequently, there are lateral loads on the synchronizing ring 13.

In the present invention, the linear actuators 20 absorb the tangential vectoring loads.

Figure 2:
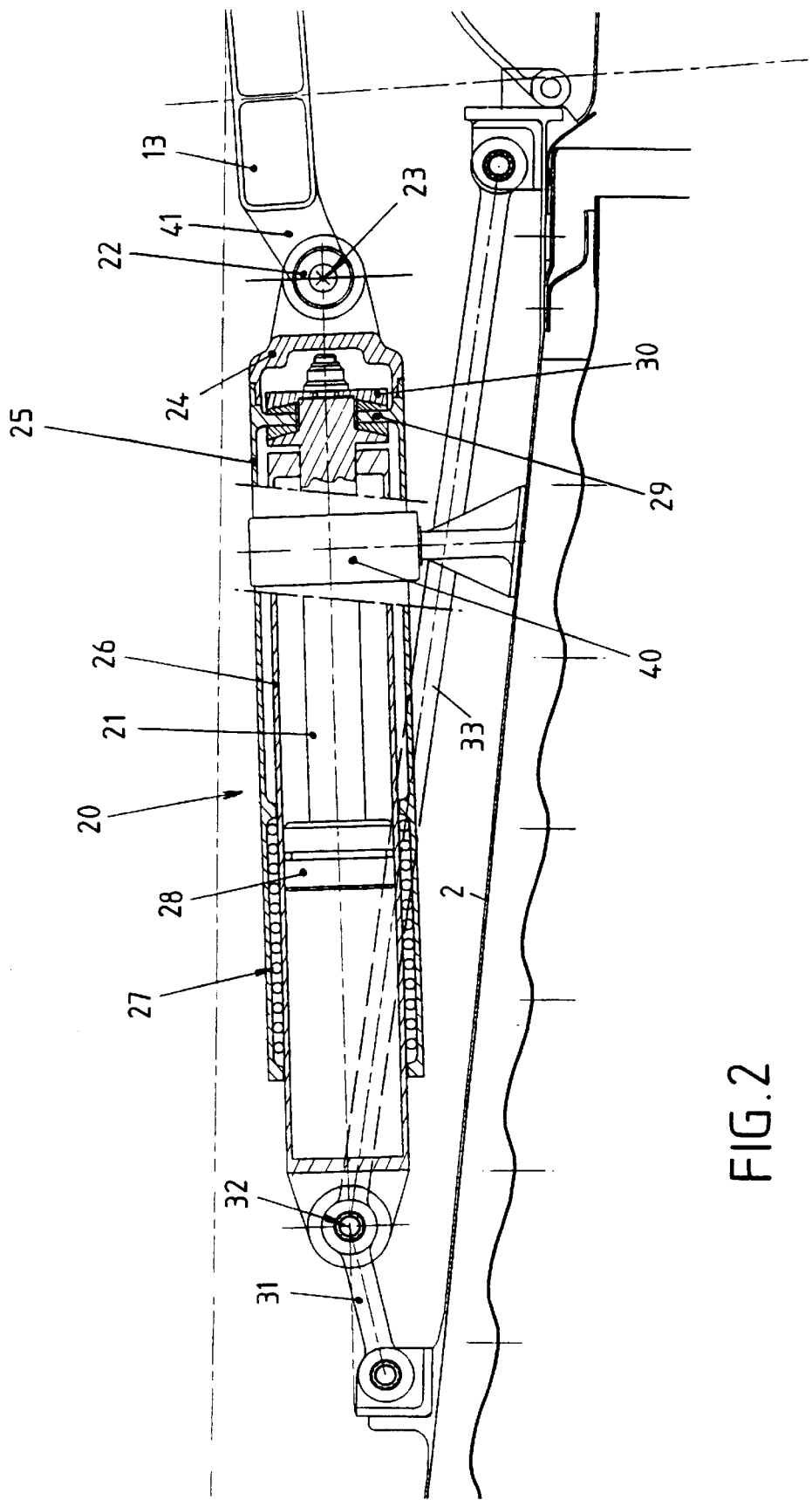
FIG. 2 is a cross-section in an axial plane through the axis of a linear actuator driving the vectoring ring of the exhaust nozzle of FIG. 1.
Figure 3:
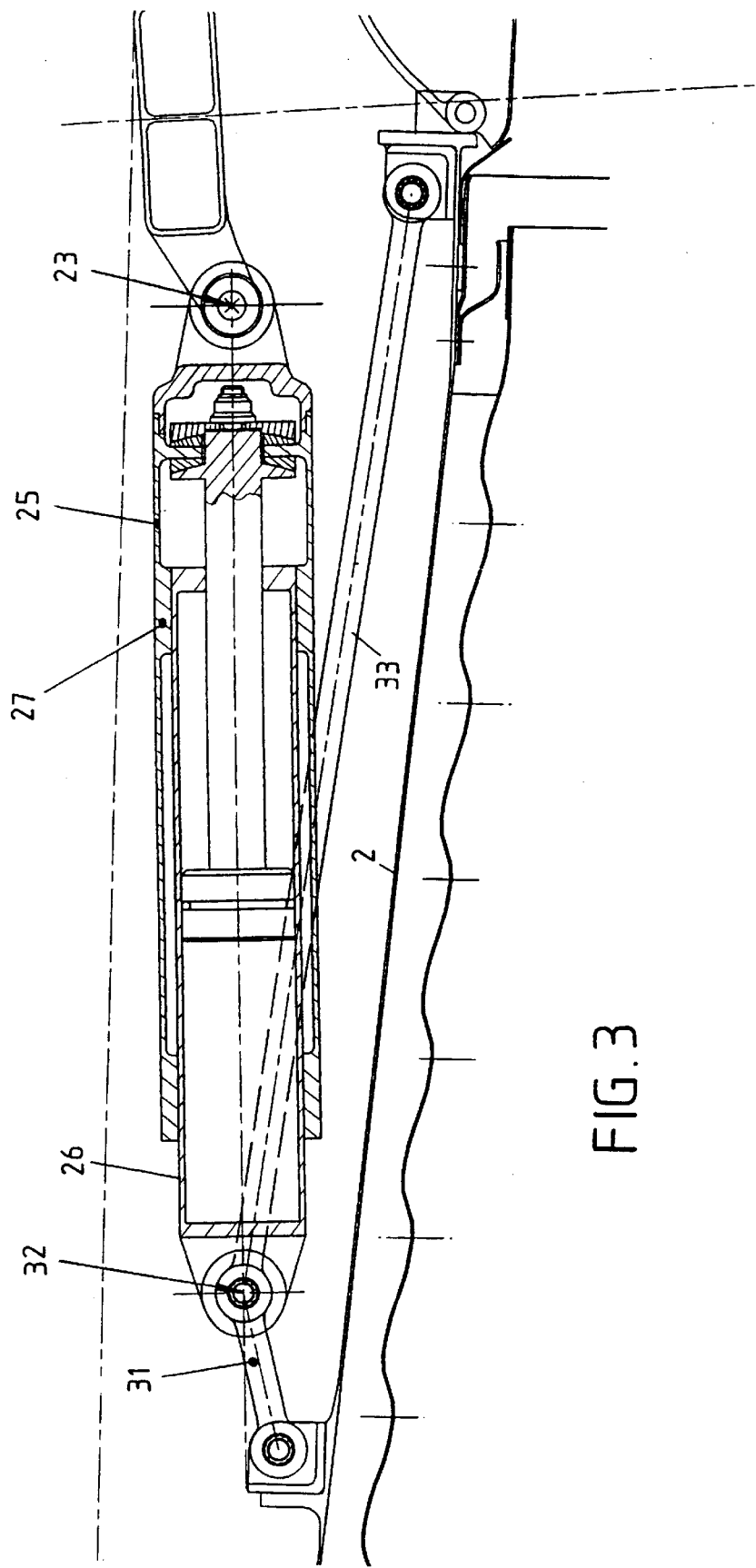
FIG. 3 is similar to FIG. 2 and shows a variation of the first embodiment of the invention.

A first embodiment of the invention, shown in FIGS. 1, 2 and 3, comprises a linear actuator 20 in the form of a bearing-actuator connected by a swivel 22 with center 23, to the vectoring ring 13. The swivel 22 allows rotating the vectoring ring 23 omnidirectionally about the point 23. The swivel 22 is firmly affixed to the end wall 24 of a sheath 25 sliding axially over the outside surface of the case 26 of the linear actuator 20. This sliding motion is implemented by suitable means 27, either a ball mounted slide as shown in FIG. 2 or a conventional bearing system similar to that shown in FIG. 3.

A piston 28 slides in the actuator case 26. This piston 28 is firmly joined to the piston rod 21. The piston rod 21 is affixed to the sheath 25 on its vertical wall 29 situated near the end wall 24. To preclude bending the end of the piston rod 21 when the tangential vectoring loads introduced at point 23 are being absorbed, the end of the piston rod 21 is linked to the wall 29 of the sheath so as to slide on the two sides of the wall 29 and to swivel by means of two spherical washer bearings 30. The upstream end of the actuator case 26 is connected to a structural element 31 rigidly joined to the stationary structure 2 by means of a radially moving pivot 32. The reference 33 denotes a tierod linking the pivot 32 to a stationary structure downstream of the stationary structure 2 and is designed to absorb at least some of the axial loads applied by the piston rod 21.

Accordingly, the linear actuator 20 is pivotable in a radial plane through the axis X as a function of the position of the vectoring ring 13.

Due to the above-described structure of the linear actuator 20, the piston rod 21 only is subject to axial loads whereas the tangential vectoring loads are absorbed by the sheath 25, the actuator case 26, and the structural element 31.

When reducing the load applied to the structural element 31, the sheath 25 slides radially between two rollers 40 connected to the stationary structure 2. These rollers prevent the linear actuator 20 from rotating tangentially. The vectoring torque generated by the point 23 and acting on the assembly of the bearing-actuator 20 is balanced between the rollers 40 and the pivot 32 of the actuator case 26 fitted with structural element 31.

The vectoring operation takes place as follows.

To set the thrust vector of the exhaust nozzle 1, the linear actuators 20 driving the vectoring ring 13 each operate individually. The piston 28 slides axially in the actuator case 26 to drive the piston rod 21. This piston rod 21 pushes or pulls the wall 29 by means of the spherical washers 30. The wall 29 drives the sheath 25 which slides in the ball-slide 27 or in the bearings, and in this manner positions the swivels 22. The swivels 22 position the vectoring ring 13 that drives the diverging flaps 6 and directs the exhaust from the exhaust nozzle 1 by means of the linkrods 11 or the secondary cold flaps.

During this motion, the webs 41 connecting the swivels 22 to the vectoring ring 13 swivel around the point 23. The assembly of the bearing-actuator 20 radially pivots around the pivot 32, and the sheath 25 slides between the two rollers 40.

The vectoring-generated aerodynamic loads on the diverging flaps 6 are transmitted through the linkrods 11 or the secondary cold flaps by applying an axial and a radial load to this vectoring ring 13.

The axial load is balanced by the pistons 28 acting on by the drive fluid. The lateral load is tangentially transmitted to the bearing-actuators 20 by the swivels 23.

FIG. 3 shows an embodiment differing from the embodiment of FIG. 2 by the absence of the guide bearings 40. In this design, the totality of the tangential load inserted through the point 23 is transmitted as a bending load onto the assembly of the bearing-actuator 20 as far as the pivot 32 on the structural element 31.

In a second embodiment of the invention, omitted from the drawings, the bending tangential vectoring loads are absorbed by the piston rods 21. In this design, the sheath 25 has been eliminated and the swivel 23 is situated at the downstream end of the piston rod 21.

Therefore, the piston rod 21 in this instance is guided by the actuator case 26. The rollers 40 are replaced by two guides firmly affixed to the stationary structure 2 allowing the piston case 26 to slide radially between them. In this second embodiment, the piston case 26 also is mounted on a structure element 31 so as to be radially pivotable about a pivot 32. A tierod 33 also is present between the pivot 32 and the downstream end of the stationary structure 2.

FIGS. 4 and 5 show a third embodiment of the invention. In this design, the case 26 of the linear actuator 20 is stationary relative to the stationary structure 2. To allow the vectoring ring 13 to move radially, it is connected to the end of the piston rod 21 of the linear actuator 20 by means of a linkrod 50 hinged radially at a point 51 on hinge 52 firmly joined to the vectoring ring 13 and swiveling on the end of the piston rod 21 at point 53.

In a design variant of this third embodiment, the swivel point 53 is situated between the linkrod 50 and the vectoring ring 13, and the radial hinge is situated between the piston rod 21 and the linkrod 50.

Figure 6:
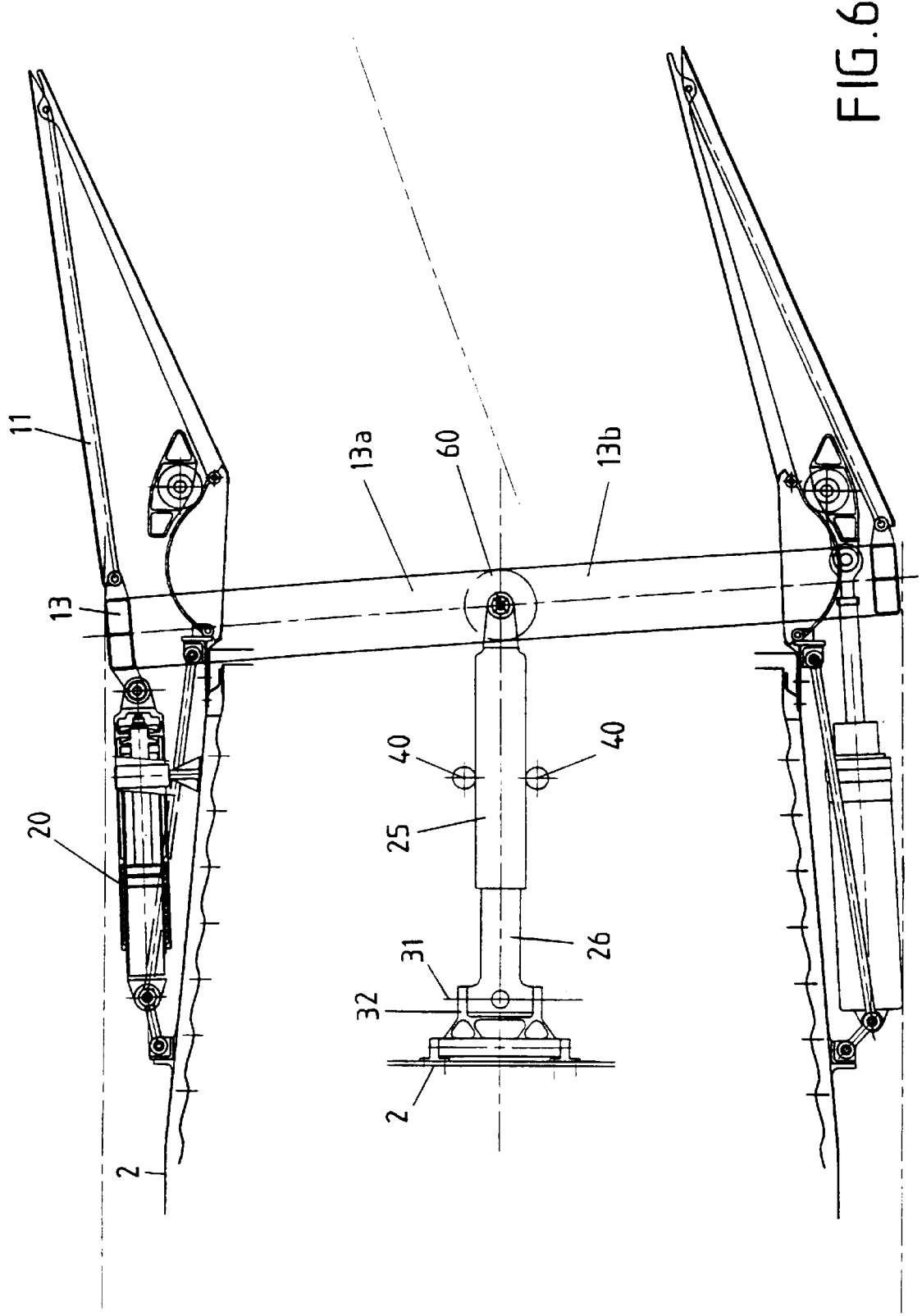
FIG. 6 shows an embodiment variation of the invention.

FIG. 6 shows an embodiment variation applicable to the above described three embodiments. This variation allows a second degree of freedom controlling the cross-section subtended by the trailing edges of the diverging flaps 6.

In this design, the vectoring ring 13 is supported entirely by the linear actuators 20 and consists of two parts 13a, 13b hinging on two diametrically opposite hinges 60.

The two-part vectoring ring 13 is kept in place and driven by the same linear actuators 20 as were described above. The number and configuration of the actuators are selected to ensure apparatus stability. During vectoring, the strokes of the piston rods 21 of the actuators 20 are controlled to pivot the parts 13a, 13b in a manner to deform—by means of the linkrods 11—the surface subtended by the trailing edges of the diverging flaps 6 in order to adjust the exhaust cross-section at any flight time in order to maintain the performance of the exhaust nozzle 1 when directed.

We claim:

1. An axisymmetric, converging-diverging turbojet-engine exhaust nozzle having a central axis X, of which a diverging portion situated downstream of a converging portion deflects a jet of exhaust gases relative to the central axis, said nozzle comprising a ring of converging flaps (3) hinging on a downstream end (5) of a stationary, annular structure (2) and a ring of diverging flaps (6) hinging on the downstream end (8) of the converging flaps (3), said diverging flaps (6) being linked to a vectoring ring (13) driven by a plurality of linear actuators (20) anchored in the stationary structure (2);

each said linear actuator (20) being linked by a swivel (22) to the vectoring ring (13) and comprising an actuator case (26) pivotably connected to a structural element (31) linked to an upstream portion of the stationary structure (2) so as to pivot in a radial plane through the axis X as a function of the position of the vectoring ring (13);

wherein each said linear actuator (20) comprises a sheath (25) slidable on an outside surface of the actuator case (26) and linked by the swivel (22) to the vectoring ring (13), a piston (28) mounted in a slidable manner in said actuator case (26), and a piston rod (21) connecting said piston (28) to the sheath (25).

2. The nozzle as claimed in claim 1 wherein an end of the piston rod (21) is connected by a sliding link (30) to a wall (29) of the sheath (25).

3. The nozzle as claimed in claim 1 wherein the sheath (25) is slidable between two rollers (40) connected to the stationary structure (2).

* * * * *